(12) United States Patent
Inui et al.

(10) Patent No.: US 8,550,488 B1
(45) Date of Patent: Oct. 8, 2013

(54) VEHICLE

(75) Inventors: Akira Inui, Shizuoka (JP); Ryota Matsubara, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/462,842

(22) Filed: May 3, 2012

(51) Int. Cl.
*B62B 7/06* (2006.01)
(52) U.S. Cl.
USPC ............................ 280/643; 280/827
(58) Field of Classification Search
USPC ............ 180/209, 311, 312; 280/781, 785, 280/789; 410/104, 105, 107, 108, 113, 116
See application file for complete search history.

(56) References Cited

U.S. PATENT DOCUMENTS

| 3,064,746 | A | 11/1962 | Williamson |
| 3,524,674 | A | 8/1970 | Medeiros |
| 5,056,856 | A | 10/1991 | Pederson |
| 6,695,566 | B2 * | 2/2004 | Rodriguez Navio ........ 414/538 |
| 6,729,647 | B2 * | 5/2004 | Shapiro et al. ............ 280/775 |
| 6,929,083 | B2 | 8/2005 | Hurlburt |
| 7,389,854 | B1 | 6/2008 | Johnson et al. |
| 7,578,523 | B2 | 8/2009 | Kosuge et al. |
| 2004/0013489 | A1 | 1/2004 | Hansen et al. |
| 2007/0231101 | A1 * | 10/2007 | Kobayashi et al. ........ 410/106 |

FOREIGN PATENT DOCUMENTS

| JP | 59-027331 Y2 | 8/1984 |
| JP | 63-202579 U | 12/1988 |
| JP | 2006-062736 A | 3/2008 |

* cited by examiner

*Primary Examiner* — Tony H. Winner
*Assistant Examiner* — Jacob Knutson
(74) *Attorney, Agent, or Firm* — Keating & Bennett, LLP

(57) ABSTRACT

A vehicle includes a body including an operation deck and an upper surface which is higher than a bottom surface of the operation deck. An operation control is provided at a front area of the operation deck to project higher than the upper surface of the body. A protective frame is provided on the body to project higher than the upper surface of the body above the operation deck. The upper surface of the body includes a front portion, a side portion, and a rear portion, and is flat along the side portion and at least one of the front and rear portions. The operation control is arranged to be folded for stowing in the operation deck. The protective frame is arranged to be removed, or at least a portion of the protective frame is arranged to be folded for stowing in the operation deck.

9 Claims, 16 Drawing Sheets

VEHICLE

BACKGROUND OF THE INVENTION

1. Field of the Invention

The present invention relates to vehicles, and more specifically, to a vehicle for use as a tow vehicle or a towed vehicle.

2. Description of the Related Art

An example of conventional techniques in this category is disclosed in U.S. Pat. No. 3,064,746, for example. U.S. Pat. No. 3,064,746 discloses a tow vehicle (tow tractor), which includes a body having a front portion, a rear portion and an intermediate portion. The intermediate portion includes an engine cover placed at a substantially central location, extending in a longitudinal direction and extending higher than the fore and the rear portions, and an operation deck provided on a side of the engine cover.

The tow vehicle does not have an arrangement for partitioning the operation deck from cargo areas thereby posing a risk that the cargo will shift into the operation deck.

Also, the tow vehicle has a bulge in the intermediate portion of the body, so that the body's upper surface is divided into left and right areas by the intermediate portion, and it is therefore not possible to provide a wide flat bed on the body's upper surface. Thus, the tow vehicle cannot haul a wide object in a stable manner. Further, the tow vehicle has a steering wheel which is provided at a front area of the operation deck and projects above the upper surfaces of the fore and the rear portions of the body. Therefore, the steering wheel will be an obstacle when hauling a wide and/or a long object. The body cannot satisfactorily function as a cargo bed especially when the tow vehicle is used as a towed vehicle.

SUMMARY OF THE INVENTION

Therefore, preferred embodiments of the present invention provide a vehicle which is capable of reducing the risk of load shifting into the operation deck during operation, and in which a body can satisfactorily function as a cargo bed.

According to a preferred embodiment of the present invention, a vehicle includes a body including an operation deck and an upper surface which is higher than a bottom surface of the operation deck; an operation control provided at a front area of the operation deck to project higher than the upper surface of the body; and a protective frame provided in the body to project higher than the upper surface of the body above the operation deck. The upper surface of the body includes a front portion which represents a front area, a side portion which represents a side area, and a rear portion which represents a rear area, as viewed from the operation deck. The upper surface of the body is flat along the side portion and along at least one of the front and rear portions. The operation control is foldable so as to be stowed in the operation deck, and the protective frame is removable, or at least a portion of the protective frame is foldable so as to be stowed in the operation deck.

According to a preferred embodiment of the present invention, the protective frame is provided in the body above the operation deck. Therefore, the arrangement reduces the risk that a cargo will shift into the operation deck. Also, the upper surface of the body is flat along the side portion and at least one of the front portion and the rear portion. This makes it possible to provide a single, large flat bed on the upper surface of the body to allow even a wide object to be placed stably on the upper surface of the body. Further, the upper surface of the body is provided at a higher level than the floor surface of the operation deck. Therefore, it is possible to fold and stow the operation control in the operation deck. Also, it is possible to fold the protective frame and stow at least a portion of the protective frame in the operation deck. Once the operation control and the protective frame have been folded, or the protective frame has been removed, the operation control and the protective frame are no longer obstacles, and therefore the body can sufficiently function as a cargo bed not only for wide objects but also for long objects.

Preferably, the protective frame includes a front frame at a front area of the operation deck; the vehicle further includes a connecting portion connecting the front frame and the operation control with each other; and the front frame is pivotable with the operation control into and out of the operation deck in a side view. In this case, when the protective frame is folded, the front frame is pivoted together with the operation control, whereby the front frame and the operation control are re-positioned easily so as not to project higher than the upper surface of the body.

Further preferably, the connecting portion includes an operation panel, and the operation control and the front frame are connected with each other via the operation panel. In this case, it is possible to pivot the operation panel together with the front frame and the operation control such that they are re-positioned so as not to project higher than the upper surface of the body.

Further, preferably, the front frame and the operation control are supported substantially coaxially. In this case, the arrangement makes it easy to pivot the front frame and the operation control, and to fold the front frame and the operation control.

Preferably, the protective frame further includes a rear frame arranged pivotably at a rear area of the operation deck, and an upper frame provided above the operation deck and connecting the front frame and the rear frame with each other. In this case, even if the vehicle is driven off-road and into bushes or woods, for example, the arrangement is capable of protecting the operator from tree branches and other obstacles.

Further preferably, the protective frame includes a front frame provided at a front area of the operation deck arranged to pivot into and out of the operation deck in a side view, and a rear frame provided at a rear area of the operation deck arranged to pivot into and out of the operation deck in a side view. In this case, when the protective frame is folded, the front frame and the rear frame are pivoted and re-positioned so as not to project higher than the upper surface of the body. Therefore, the protective frame leaves no obstacles, making the operation deck more useful as a cargo bed together with the flat upper surface of the body.

Further, preferably, the vehicle includes a lid member placed on the front frame and the rear frame after folding the front frame and the rear frame. In this case, placing the lid member on the folded front frame and rear frame makes the operation deck even more useful as a cargo bed together with the flat upper surface of the body. The lid member may be disposed such that it does not create any significant gap between the upper surface of the body and the lid member, or such that the lid member provides an upper surface which is flush with the upper surface of the body, so that the operation deck can be used even more effectively as a cargo bed.

Preferably, the vehicle further includes a seat provided in the operation deck, and the seat includes a seating surface substantially as high as the upper surface of the body. In this case, when, for example, the protective frame is removed and the lid member is placed in the operation deck to provide a substantially flush surface with the upper surface of the body, the seat can serve as a support for the lid member.

Further preferably, the vehicle further includes a coupler provided in the body to connect the vehicle with another vehicle. Generally, tow vehicles and towed vehicles capable of hauling cargo on the upper surface of their bodies provide increased convenience. According to the vehicle of various preferred embodiments of the present invention, the body satisfactorily functions as a cargo bed. Therefore, the preferred embodiments of the present invention provide particular advantages in cases where the vehicle is connected to another vehicle via the coupler, i.e., when the vehicle is used as a tow vehicle or a towed vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

It is noted that the terms right and left, front and rear, up and down as used in the description of preferred embodiments of the present invention are determined from the operator's position on a seat 52 of a vehicle 10, with the operator facing toward an operation control 60.

Figure 1:
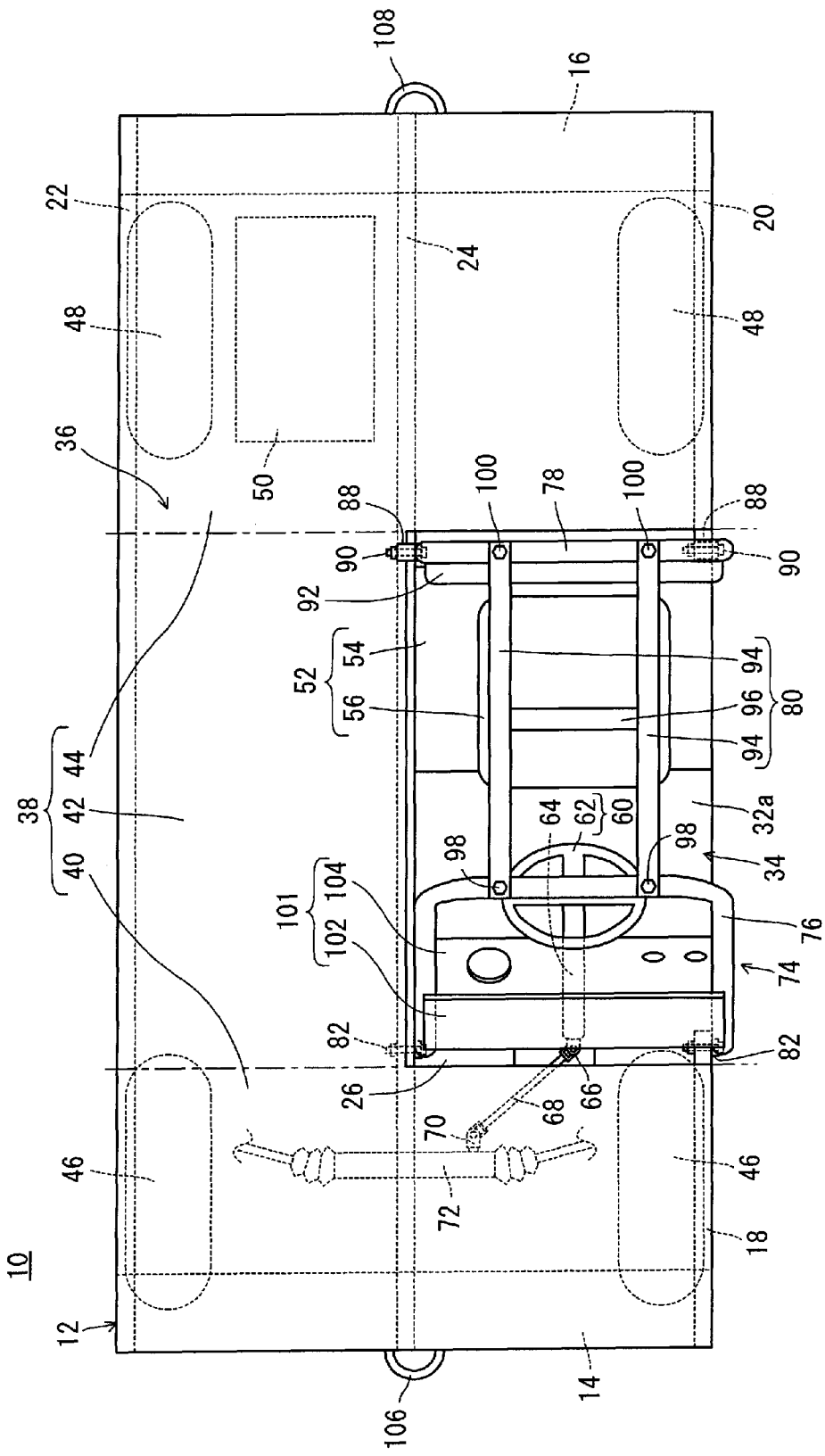
FIG. 1 is a plan view of a vehicle according to a preferred embodiment of the present invention.
Figure 2:
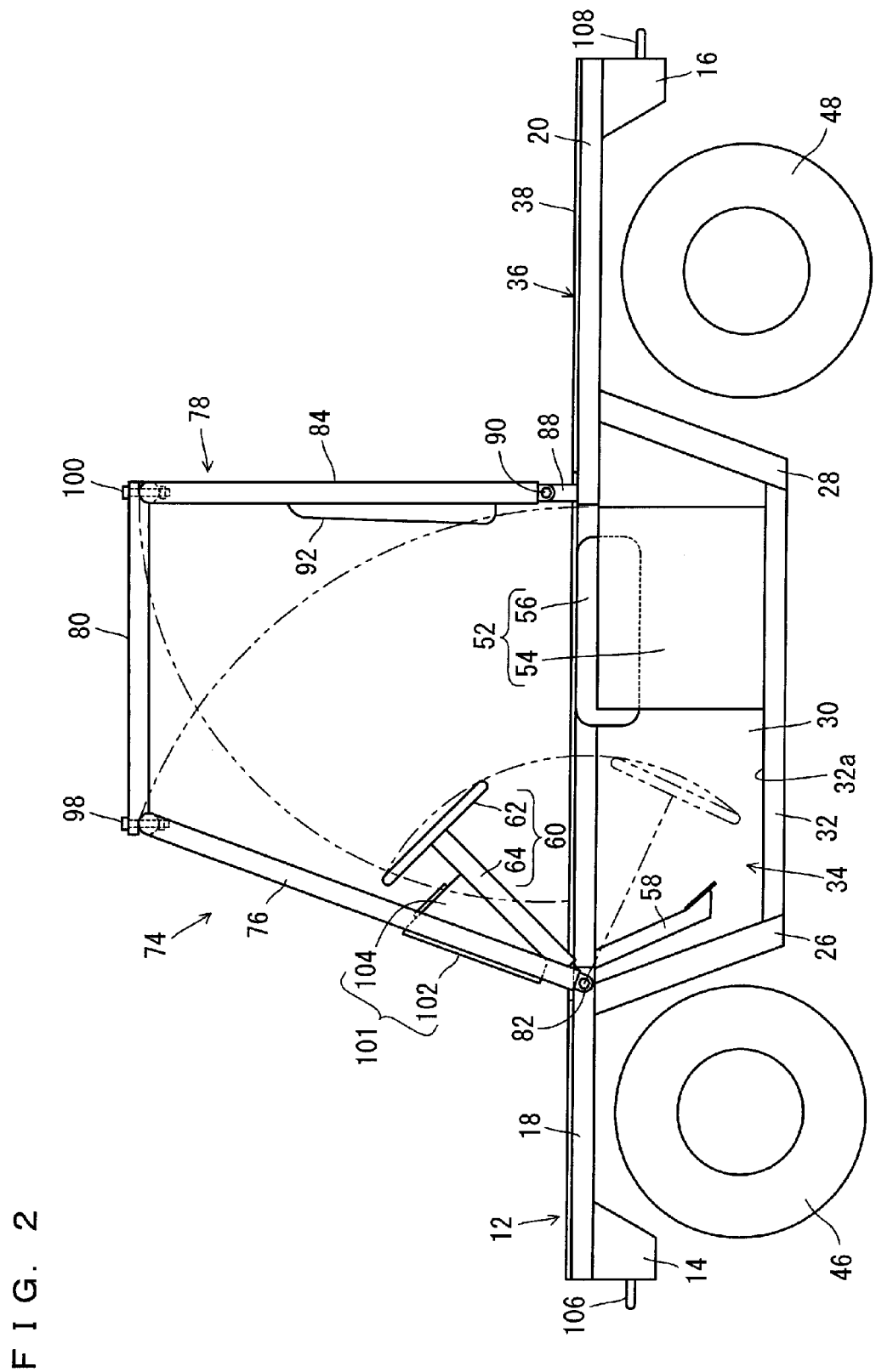
FIG. 2 is a side view of the vehicle according to a preferred embodiment of the present invention.

Referring to FIG. 1 and FIG. 2, the vehicle 10 according to a preferred embodiment of the present invention can be a tow vehicle or a towed vehicle. The vehicle 10 includes a body 12.

The body 12 includes lateral frames 14 and 16. The lateral frames 14 and 16 are disposed at a front end portion and a rear end portion of the vehicle 10 respectively, extending in the left-right direction and preferably in parallel to each other. The lateral frames 14 and 16 are each made of a tube which has a trapezoidal cross-section, for example.

On the lateral frames 14 and 16, there are disposed longitudinal frames 18, 20, 22 and 24. The longitudinal frames 18, 20, 22 and 24 are each made of a tube which has a rectangular cross-section, for example. The longitudinal frames 18 and 20 are shorter than the longitudinal frames 22 and 24. The longitudinal frame 18 includes a front end portion located on a left end portion of the lateral frame 14 and extends rearward therefrom. The longitudinal frame 20 includes a rear end portion located on a left end portion of the lateral frame 16 and extends forward therefrom. The longitudinal frames 18 and 20 are preferably disposed on the same straight line. The longitudinal frame 22 includes two end portions placed on a right end portion of the lateral frame 14 and on a right end portion of the lateral frame 16 respectively, and extends in the fore-aft direction. In other words, the longitudinal frame 24 connects the lateral frames 14 and 16 with each other at their respective right end portions. The longitudinal frame 24 includes two end portions placed on a center portion of the lateral frame 14 and on a center portion of the lateral frame 16 respectively, and extends in the fore-aft direction. In other words, the longitudinal frame 22 connects the lateral frames 14 and 16 with each other at their center portions. The longitudinal frames 18, 22 and 24 are preferably disposed in parallel to each other and the longitudinal frames 20, 22 and 24 are preferably disposed in parallel to each other.

The body 12 includes an operation deck 34 defined by a front wall portion 26, a rear wall portion 28, a side wall portion 30, a floor portion 32, and an upper surface 38 of the body 12. In other words, the operation deck 34 is a space which is surrounded by the front wall portion 26, the rear wall portion 28, the side wall portion 30 and the floor portion 32, and is not higher than the upper surface 38 of the body 12. The operation deck 34 is provided at a substantially center portion on the left side of the body 12. The front wall portion 26 preferably extends parallel or substantially parallel to the left-right direction of the vehicle 10, connects a rear end portion of the longitudinal frame 18 with the longitudinal frame 24, and extends in an obliquely downward and rearward direction. The front wall portion 26 has an upper-end center where there is provided a structure to connect a steering shaft 64 with a steering shaft 68 via a universal joint 66. The rear wall portion 28 preferably extends parallel to the left-right direction of the vehicle 10, connecting a front portion of the longitudinal frame 20 with the longitudinal frame 24, and extending in an obliquely downward and forward direction. The side wall portion 30 preferably extends parallel or substantially parallel to the fore-aft direction of the vehicle 10, and is provided in a lower surface of the longitudinal frame 24 to connect the front wall portion 26 and the rear wall portion 28 with each other. The floor portion 32 is connected with the front wall portion 26, the rear wall portion 28, and the side wall portion 30. The floor portion 32 includes a front end portion connected with a lower end portion of the front wall portion 26, a rear end portion connected with a lower end portion of the rear wall portion 28, and a side end portion connected with a lower end portion of the side wall portion 30.

On the longitudinal frames 18, 20, 22 and 24, there is attached a generally U-shaped platy or flat member 36 except for an area substantially corresponding to the operation deck 34. The platy member 36 preferably is a steel plate, for example. The platy member 36 may include a single plate or may include a plurality of members. The platy member 36 includes an upper surface serving as the upper surface 38 of the body 12. The upper surface 38 of the body 12 includes a front portion 40 which represents a front area as viewed from the operation deck 34, a side portion 42 which represents a side area as viewed from the operation deck 34, and a rear portion 44 which represents a rear area as viewed from the operation deck 34. All areas in the upper surface 38 of the body 12 are flush with each other so as to be flat from the front portion 40 through the side portion 42 and then to the rear portion 44. The upper surface 38 of the body 12 is higher than an upper surface (hereinafter called "floor surface") 32a of the floor portion 32 of the operation deck 34.

A pair of front wheels 46 are provided below the front portion 40 of the body 12 and a pair of rear wheels 48 are provided below the rear portion 44 of the body 12. A drive 50 is provided between the rear wheels 48. Power from the drive 50 is transmitted to the rear wheels 48 via an unillustrated axle etc., to drive the rear wheels 48. The drive 50 may be provided by an engine, an electric motor, etc.

A seat 52 is disposed at a rear area of the operation deck 34 on the floor surface 32a. The seat 52 includes a rectangular parallelepiped seat base 54, and a seat plate 56 provided substantially in the middle of the seat base 54. A pedal 58 is provided near the front wall portion 26 of the operation deck 34.

The operation control 60 is located at a front area of the operation deck 34. Normally, the operation control 60 is raised so as to project higher than the upper surface 38 of the body 12. The operation control 60 includes a steering wheel 62 and the steering shaft 64 which supports the steering wheel 62. The steering shaft 64 is connected with the steering shaft 68 via the universal joint 66 which is located near the front wall portion 26. The steering shaft 68 is connected with a tie-rod 72 via steering gears 70, such as a rack and a pinion, to the pair of front wheels 46 via unillustrated knuckle arms, for example.

The steering shaft 64 is pivotable on the universal joint 66. This allows the operation control 60 to be stowed in the operation deck 34 so as not to project higher than the upper surface 38 of the body 12.

The body 12 is provided with a protective frame 74 above the operation deck 34. Normally, the protective frame 74 is raised so as to project higher than the upper surface 38 of the body 12. The protective frame 74 includes a front frame 76, a rear frame 78 and an upper frame 80, and is generally U-shaped in a side view.

The front frame 76 is at a front area of the operation deck 34 and is generally U-shaped. The front frame 76 is connected pivotably to the longitudinal frames 18 and 24 near an upper-end portion of the front wall portion 26. The front frame 76 includes a left end portion connected to a left-side surface of a rear end portion of the longitudinal frame 18 with a fastener 82. The front frame 76 includes a right end portion connected to a left-side surface of the longitudinal frame 24 with a fastener 82 at a position corresponding to the rear end portion of the longitudinal frame 18 in terms of the left-right direction. In other words, the front frame 76 includes two side-pillar portions positioned side-by-side in the left-right direction of the body 12. Therefore, the front frame 76 is pivotable on the two fasteners 82 into or out of the operation deck 34 in a side view. It should be noted here that the two fasteners 82 and the universal joint 66 may be provided on a same axis which extends in the left-right direction of the body 12. In other words, the front frame 76 and the operation control 60 may be supported coaxially.

The fastener 82 preferably includes a bolt and a nut, for example. Preferably, the fastener 82 may include a collar, in which case the collar is placed between the bolt and the nut. The same arrangement may apply to fasteners 90 which will be described below.

Figure 3:
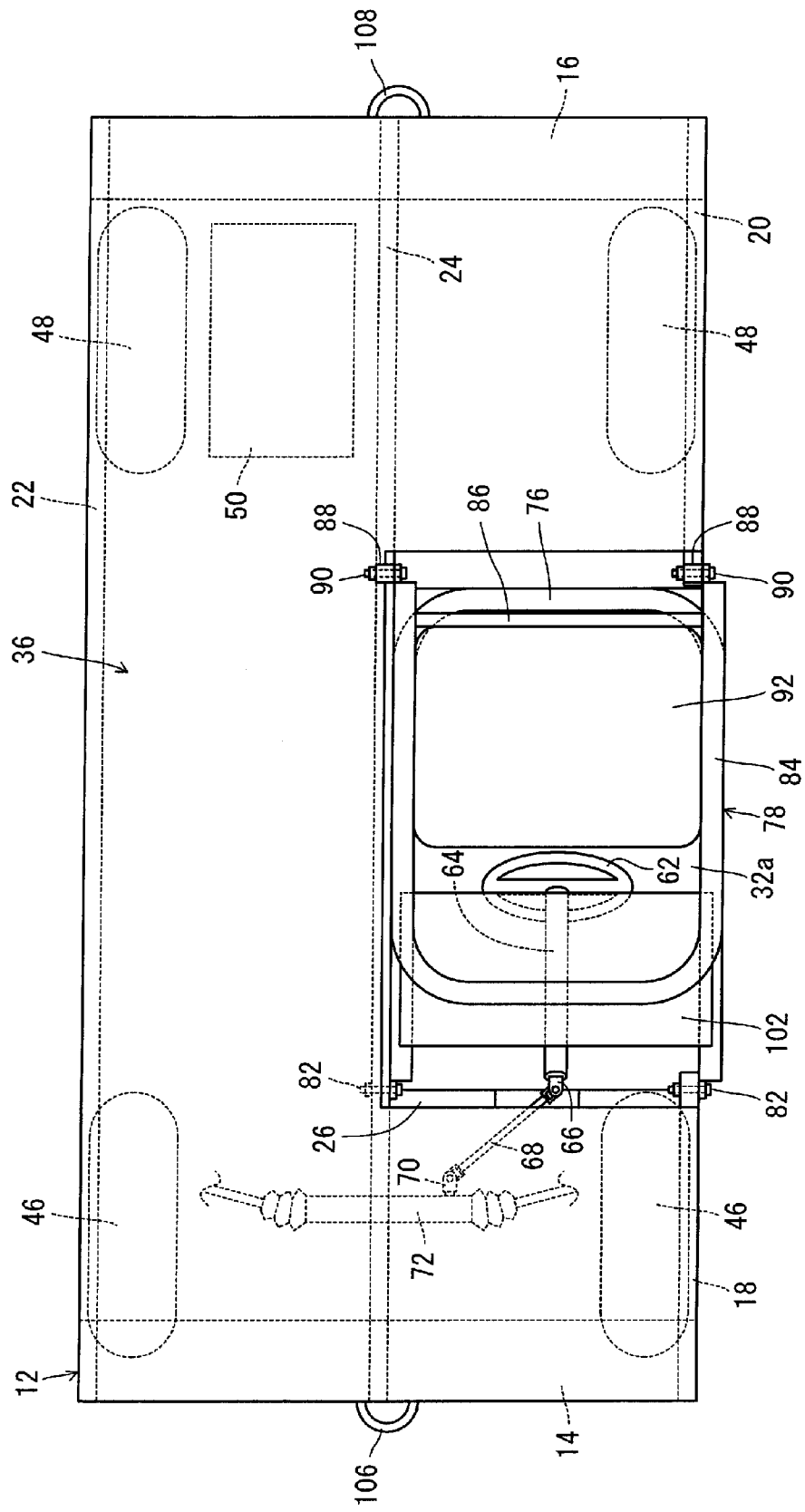
FIG. 3 is a plan view of the preferred embodiment shown in FIG. 1 and FIG. 2, in which a protective frame and an operation control are in a folded state.
Figure 4:
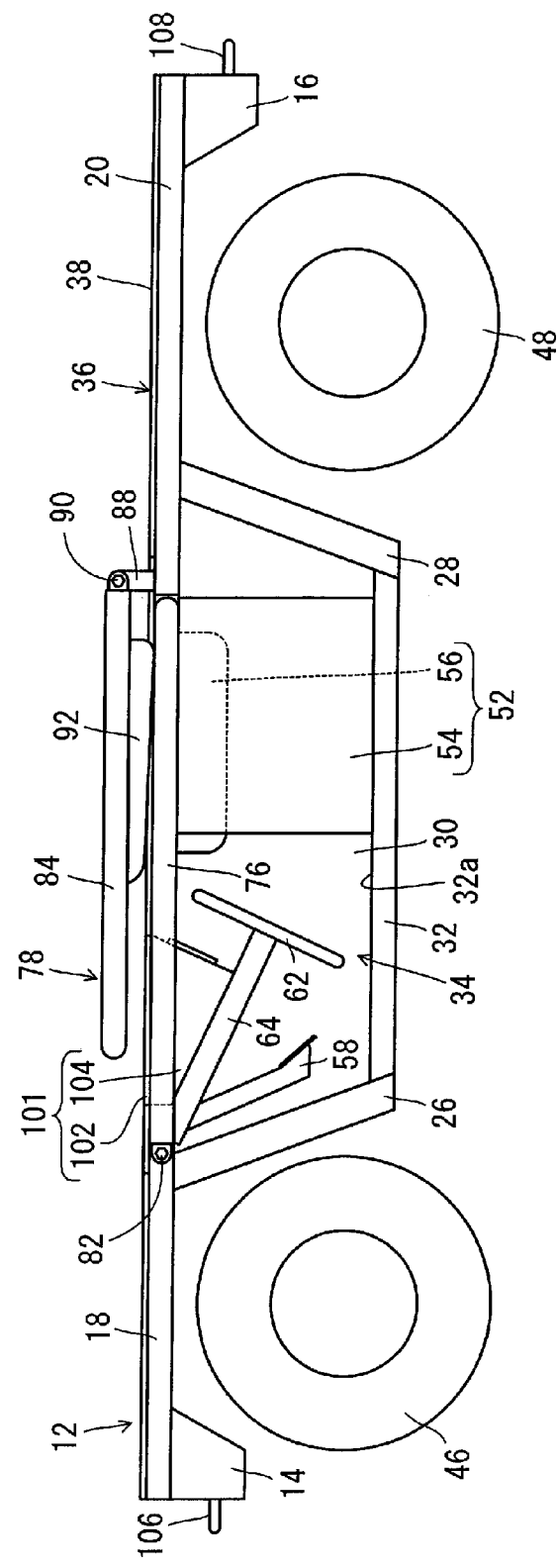
FIG. 4 is a side view of the preferred embodiment shown in FIG. 1 and FIG. 2, in which the protective frame and the operation control are in the folded state.

The rear frame 78 is located at a rear area of the operation deck 34, and includes a generally U-shaped frame portion 84; a straight bar-shaped frame portion 86 (see FIG. 3) which connects two near-end portions of the frame portion 84 with each other; and two rod-shaped members 88. The two rod-shaped members 88 are located at a rear area of the operation deck 34 but forward of the rear portion 44. One of the rod-shaped members 88 is erected on a front end portion of the longitudinal frame 20. The other rod-shaped member 88 is erected on the longitudinal frame 24, at a position corresponding to the front end portion of the longitudinal frame 20 in terms of the left-right direction. In other words, the two rod-shaped members 88 are spaced apart from each other in the left-right direction of the body 12. The frame portion 84 includes two end-portions connected to respective ones of the two rod-shaped members 88 with two fasteners 90. This arrangement makes the frame portion 84 pivotable on the two fasteners 90 along a vertical plane which includes the fore-aft direction. The frame portion 84 is provided with a seat back 92.

The upper frame 80 is generally H-shaped. The upper frame 80 includes two beam-shaped members 94 preferably disposed in parallel or substantially in parallel to each other, and a brace-like member 96 connecting the two beam-shaped members 94 with each other at their middle portions. The upper frame 80 connects the front frame 76 and the rear frame 78 with each other. In other words, the two beam-shaped members 94 include front end portions connected to a center portion of the front frame 76 by two fasteners 98 and the two beam-shaped members 94 include rear end portions connected to a substantially center portion of the frame portion 84 in the rear frame 78 by two fasteners 100.

The steering shaft 64 is connected to the front frame 76 of the protective frame 74, described above, by a connecting portion 101. The connecting portion 101 includes, for example, a generally rectangular plate portion 102 and an operation panel 104 which includes input devices, instruments, etc. The plate portion 102 is attached to the front frame 76. The plate portion 102 connects two side portions of the front frame 76 at their near-end positions of the front frame 76. The plate portion 102 is attached to a front of the front frame 76. The plate portion 102 and the steering shaft 64 of the operation control 60 are preferably integral with each other via the operation panel 104. Therefore, the front frame 76, the operation control 60 and the operation panel 104 are preferably pivotable integrally as a whole into or out of the operation deck 34 in a side view.

The body 12 includes a front end center portion and a rear-end center portion provided with couplers 106 and 108, respectively, to connect the vehicle 10 with another vehicle.

Referring to FIG. 1 through FIG. 4, description will now be made for a folding operation of the operation control 60 and the protective frame 74 in the vehicle 10.

First, the two fasteners 98 and the two fasteners 100 are removed to separate the upper frame 80 from the front frame 76 and the rear frame 78. Thereafter, the front frame 76 is pivoted together with the connecting portion 101 on the two fasteners 82 until the front frame 76 comes in contact with an upper surface of the seat base 54 of the seat 52. This folding operation simultaneously moves the operation control 60, i.e., the steering wheel 62 and the steering shaft 64, to be pivoted on the universal joint 66 and stowed in the operation deck 34 so that it will not project higher than the upper surface 38 of the body 12. Then, the frame portion 84 of the rear frame 78 is pivoted forward on the two fasteners 90 until the seat back 92 comes in contact with the upper surface of the seat plate 56. By performing the above-described procedure, the operation control 60 and the protective frame 74 can be folded down. According to the vehicle 10, with the operation control 60 and the protective frame 74 being in the folded state, the front frame 76 no longer projects above the upper surface 38 of the body 12, but the rear frame 78 projects above the upper surface 38 of the body 12.

According to the vehicle 10 as described above, the protective frame 74 which is provided in the body 12 above the operation deck 34 reduces the risk that cargo (not illustrated) shifts into the operation deck 34. Also, the upper surface 38 of the body 12 is flat from the front portion 40, through the side portion 42, to the rear portion 44. The arrangement makes it possible to provide a large single flat bed on the upper surface 38 of the body 12 to allow even a wide object to be placed stably on the upper surface 38 of the body 12. Further, the upper surface 38 of the body 12 is provided at a higher level than the floor surface 32a of the operation deck 34, and therefore it is possible to fold and stow the operation control 60 in the operation deck 34. It is also possible to fold the protective frame 74 so that the front frame 76 will not project higher than the upper surface 38 of the body 12. In other words, it is possible to stow at least a portion of the protective frame 74 in the operation deck 34. Once the operation control 60 and the protective frame 74 have been folded, the operation control 60 and the protective frame 74 are no longer obstacles, and therefore the body 12 can satisfactorily function as a cargo bed not only for wide objects but also for long objects.

The front frame 76 and the operation control 60 are connected with each other by the connecting portion 101 which includes the operation panel 104. Thus, when the protective frame 74 is folded, the front frame 76 is pivoted and placed easily together with the operation control 60 so that the front frame 76 and the operation control 60 will not project higher than the upper surface 38 of the body 12. It is also possible to pivot the operation panel 104 together with the front frame 76 and the operation control 60 so that it will not project higher than the upper surface 38 of the body 12.

Since the front frame 76 and the operation control 60 are supported substantially coaxially, it is easy to pivot the front frame 76 and the operation control 60 making it easy to fold the front frame 76 and the operation control 60.

The protective frame 74 includes the rear frame 78 and the upper frame 80 in addition to the front frame 76. Therefore, even if the vehicle 10 is driven off-road and into bushes or woods, for example, the arrangement is capable of protecting the operator from tree branches and other obstacles.

According to the vehicle 10, the body 12 satisfactorily functions as a cargo bed. Therefore, preferred embodiments of the present invention are particularly advantageous in cases where the vehicle 10 is connected to another vehicle via the coupler 106 or 108, i.e., when the vehicle 10 is used as a tow vehicle or a towed vehicle.

Figure 5:
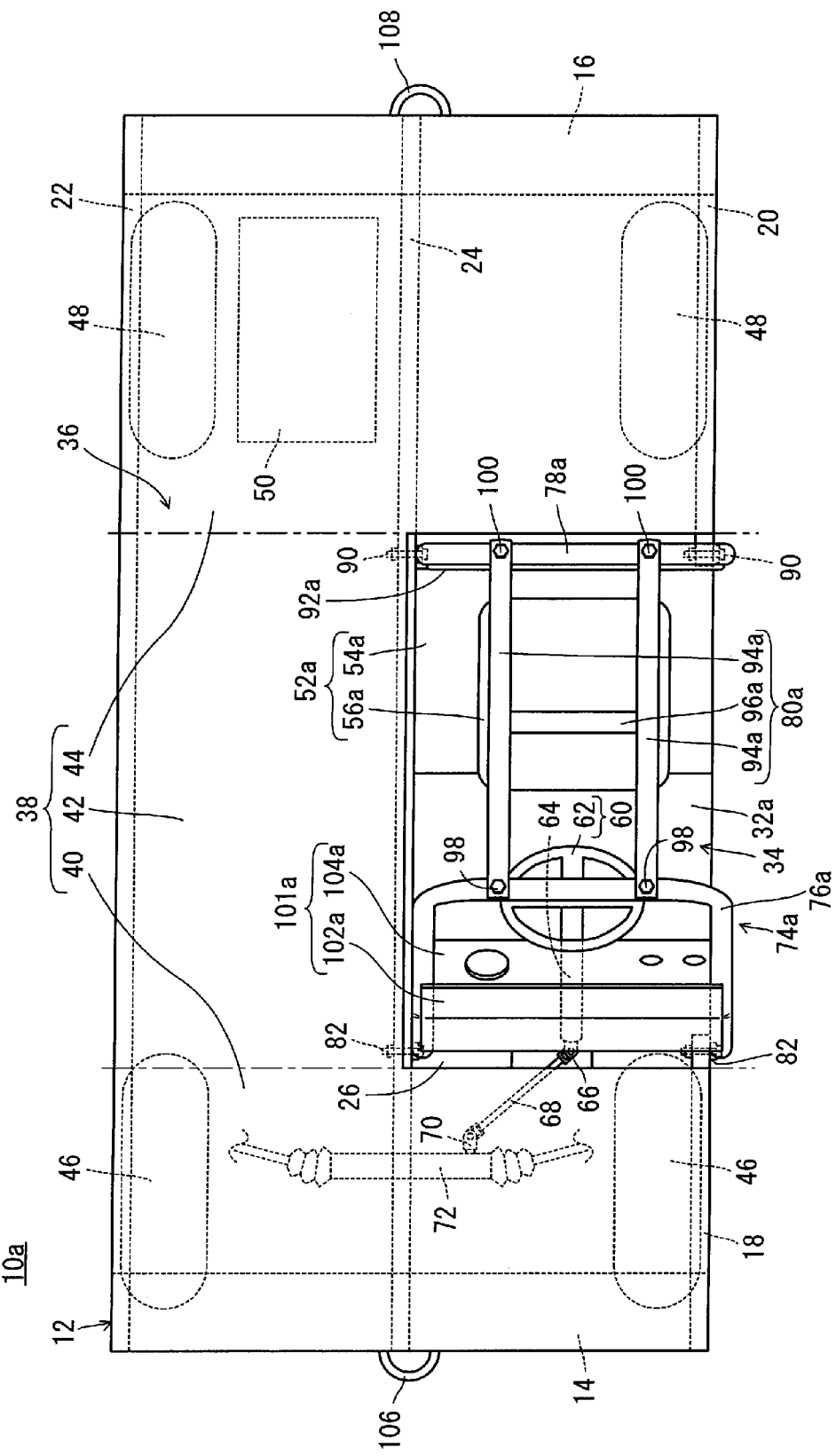
FIG. 5 is a plan view of a vehicle according to another preferred embodiment of the present invention.
Figure 6:
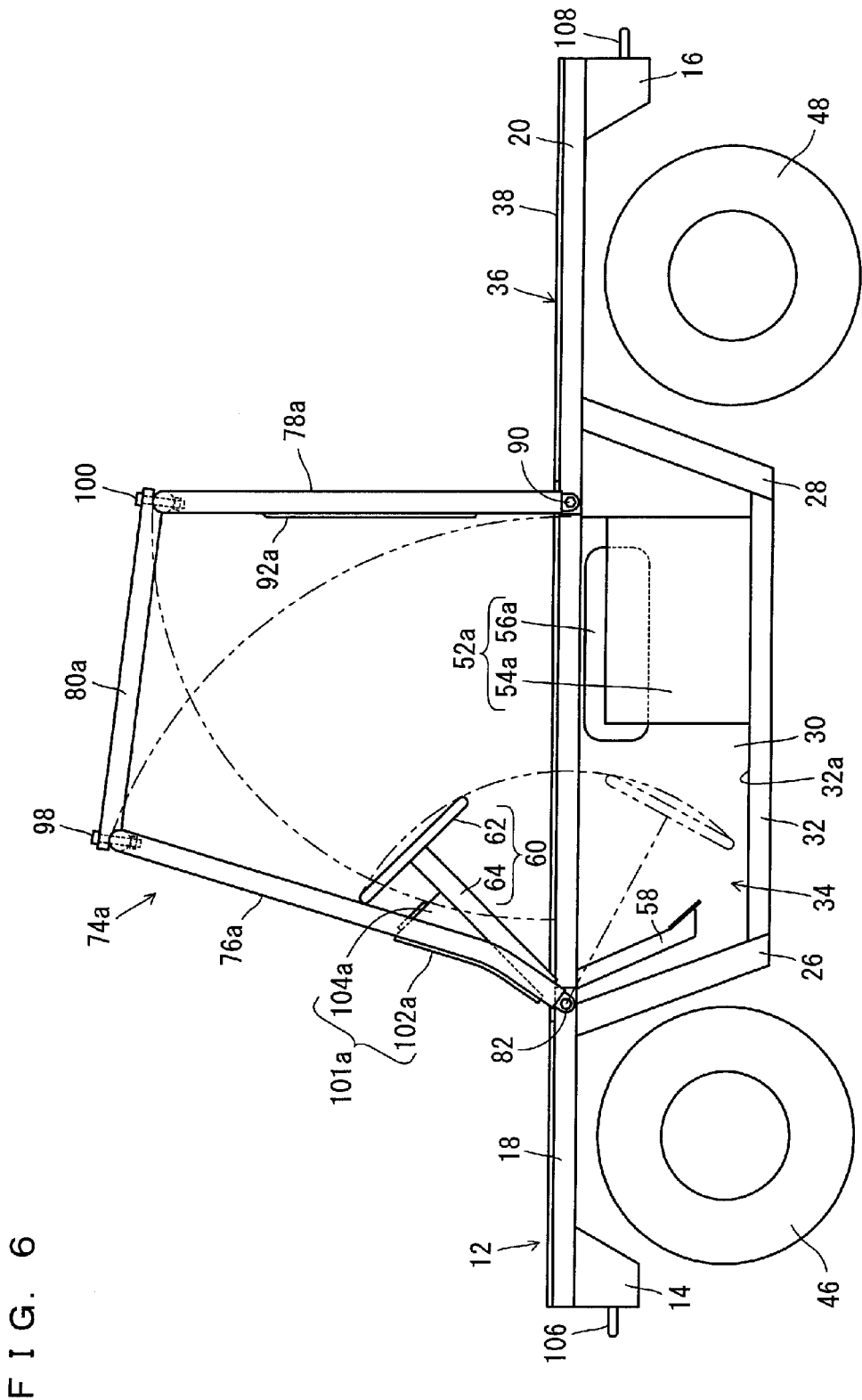
FIG. 6 is a side view of the vehicle according to the another preferred embodiment of the present invention.

Next, reference will be made to FIG. 5 and FIG. 6 to describe a vehicle 10a according to another preferred embodiment of the present invention.

The vehicle 10a includes a protective frame 74a instead of the protective frame 74 of the vehicle 10 shown in FIG. 1 and FIG. 2. Normally, the protective frame 74a is raised to project higher than the upper surface 38 of the body 12. The protective frame 74a includes a front frame 76a, a rear frame 78a and the upper frame 80a, and is generally U-shaped in a side view.

The front frame 76a is located at a front area of the operation deck 34 and is generally U-shaped. As understood from FIG. 6, two side-pillar portions of the front frame 76a are slightly bent in a general shape of a letter V projecting in the rear direction in a side view in a normal setting. The front frame 76a is connected pivotably to the longitudinal frames 18 and 24 near an upper-end of the front wall portion 26. The front frame 76a includes a left end portion connected to a left-side surface of a rear end portion of the longitudinal frame 18 with a fastener 82. The front frame 76a includes a right end portion connected to a left-side surface of the longitudinal frame 24, at a position corresponding to the rear end portion of the longitudinal frame 18 in the left-right direction, with a fastener 82. In other words, the front frame 76a includes two side-pillar portions positioned side-by-side in the left-right direction of the body 12. Therefore, the front frame 76a is pivotable on the two fasteners 82 along a vertical plane which includes the fore-aft direction into or out of the operation deck 34 in a side view. It should be noted here that the two fasteners 82 and the universal joint 66 are provided on substantially the same axis extending in the left-right direction of the body 12. In other words, the front frame 76a and the operation control 60 are supported substantially coaxially.

Figure 7:
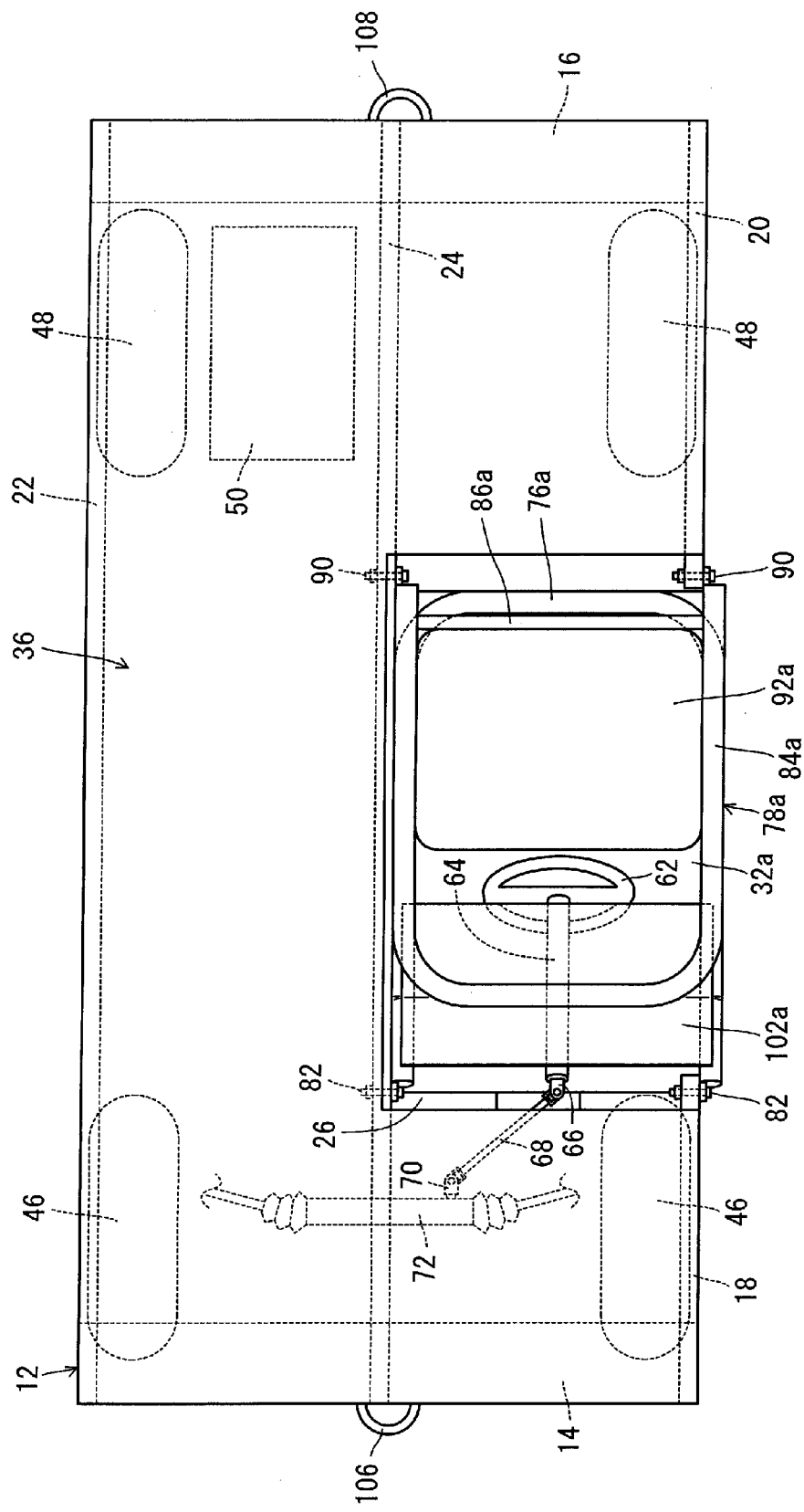
FIG. 7 is a plan view of the preferred embodiment shown in FIG. 5 and FIG. 6, in which a protective frame and an operation control are in a folded state.
Figure 8:
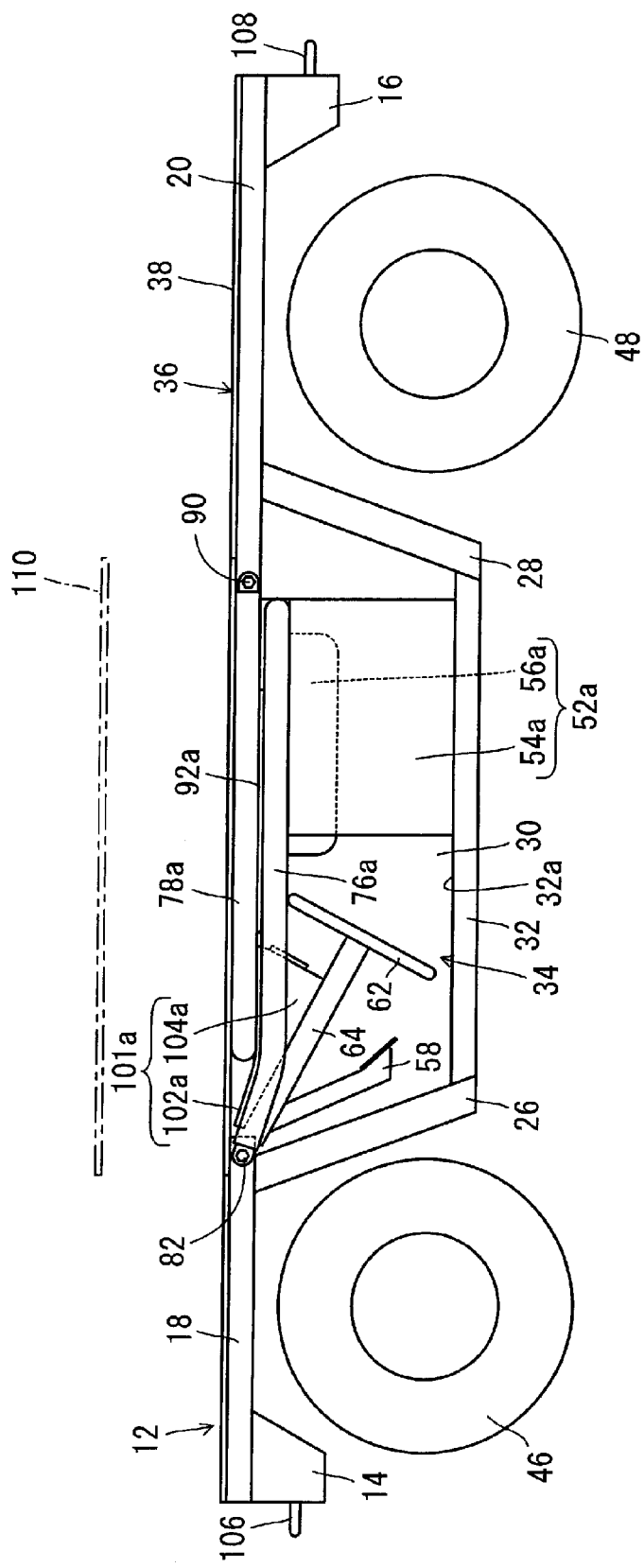
FIG. 8 is a side view of the preferred embodiment shown in FIG. 5 and FIG. 6, in which the protective frame and the operation control are in the folded state.

The rear frame 78a is located at a rear area of the operation deck 34, and includes a generally U-shaped frame portion 84a, and a straight bar-shaped frame portion 86a (see FIG. 7) which connects two near-end portions of the frame portion 84a with each other. The frame portion 84a includes two end portions positioned at a rear of the operation deck 34 but forward of the rear portion 42. The frame portion 84a includes a left end portion connected to a left-side surface of a front end portion of the longitudinal frame 20 with a fastener 90. The frame portion 84a includes a right end portion connected to a left-side surface of the longitudinal frame 24, at a position corresponding to the front end portion of the longitudinal frame 20 in terms of the left-right direction, with a fastener 90. In other words, the frame portion 84a includes two side-pillar portions positioned side-by-side in the left-right direction of the body 12. Therefore, the rear frame 78a is pivotable on the two fasteners 90 along a vertical plane which includes the fore-aft direction into or out of the operation deck 34 in a side view. The rear frame 78a is provided with a seat back 92a.

The upper frame 80a is generally H-shaped. The upper frame 80a includes two beam-shaped members 94a preferably disposed in parallel or substantially in parallel to each other, and a brace member 96a connecting the two beam-shaped members 94a with each other at their middle portions. The upper frame 80a connects the front frame 76a and the rear frame 78a with each other. In other words, the two beam-shaped members 94a include front end portions connected to a center portion of the front frame 76a by two fasteners 98 and the two beam-shaped members 94a include rear end portions connected to a substantially center portion of the frame portion 84a in the rear frame portion 78a by two fasteners 100.

The steering shaft 64 is connected to the front frame 76a of the protective frame 74a, described above, by a connecting portion 101a. The connecting portion 101a includes, for example, a plate portion 102a which is generally rectangular but is slightly curved along the shape of the front frame 76a, and an operation panel 104a which includes input devices, instruments, etc. The plate portion 102a is attached to the front frame 76a. The plate portion 102a connects two side portions of the front frame 76a at their near-end positions of the front frame 76a. The plate portion 102a is attached to a front surface of the front frame 76a. The plate portion 102a and the steering shaft 64 of the operation control 60 are integral with each other via the operation panel 104a. Therefore, the front frame 76a, the operation control 60 and the operation panel 104a are pivotable integrally as a whole into or out of the operation deck 34 in a side view.

The seat back 92a is attached to the frame portion 84a with a slight forward bulge from the frame portion 84a in a side view.

A seat 52a includes a rectangular parallelepiped seat base 54a and a seat plate 56a provided substantially in the middle of the seat base 54a. The seat base 54a is lower than the seat base 54 of the vehicle 10 in the previous preferred embodiment. Therefore, the seat 52a has a lower seating surface than the seat 52 of the vehicle 10 in the previous preferred embodiment. The height of the seating surface of the seat 52a is chosen so that no portion of the rear frame 78a will project higher than the upper surface 38 of the body 12 when the rear frame 78a is folded down.

Other configurations preferably are the same as the vehicle 10, so repetitive description will not be given here.

Referring to FIG. 5 through FIG. 8, description will now be made for a folding operation of the operation control 60 and the protective frame 74a in the vehicle 10a.

First, the two fasteners 98 and the two fasteners 100 are removed to separate the upper frame 80a from the front frame 76a and the rear frame 78a. Thereafter, the front frame 76a is pivoted together with the connecting portion 101a on the two fasteners 82 until the front frame 76a comes in contact with an upper surface of the seat base 54a of the seat 52a. This folding operation simultaneously moves the operation control 60, i.e., the steering wheel 62 and the steering shaft 64, to be pivoted on the universal joint 66 and stowed in the operation deck 34 so that it will not project higher than the upper surface 38 of the body 12. Then, the rear frame 78a is pivoted forward on the two fasteners 90 until the seat back 92a comes in contact with the upper surface of the seat plate 56a. By following the above-described procedure, the operation control 60 and the protective frame 74a are folded so that they do not project higher than the upper surface 38 of the body 12. Then, a lid member 110 is placed on the folded protective frame 74a. The lid member 110 does not create any significant gap between the upper surface 38 of the body 12 and the lid member 110 thereby providing a substantially flush upper surface with the upper surface 38 of the body 12.

The vehicle 10a as described above provides the same advantages as offered by the vehicle 10.

Also, according to the vehicle 10a, when the protective frame 74a is folded, the front frame 76a and the rear frame 78a are swung down so as not to project higher than the upper surface 38 of the body 12. Therefore, the protective frame 74a leaves no obstacles, making the operation deck 34 more useful as a cargo area together with the flat upper surface 38 on the body 12.

Placing the lid member 110 on the folded front frame 76a and rear frame 78a makes the operation deck 34 even more useful as a cargo bed together with the flat upper surface 38 on the body 12. Also, according to the lid member 110, no significant gap is created between the upper surface 38 of the body 12 and the lid member 110, and the upper surface 38 of the body 12 and the upper surface of the lid member 110 become substantially flush with each other. Therefore, the operation deck 34 can be used more effectively as a cargo bed.

Figure 9:
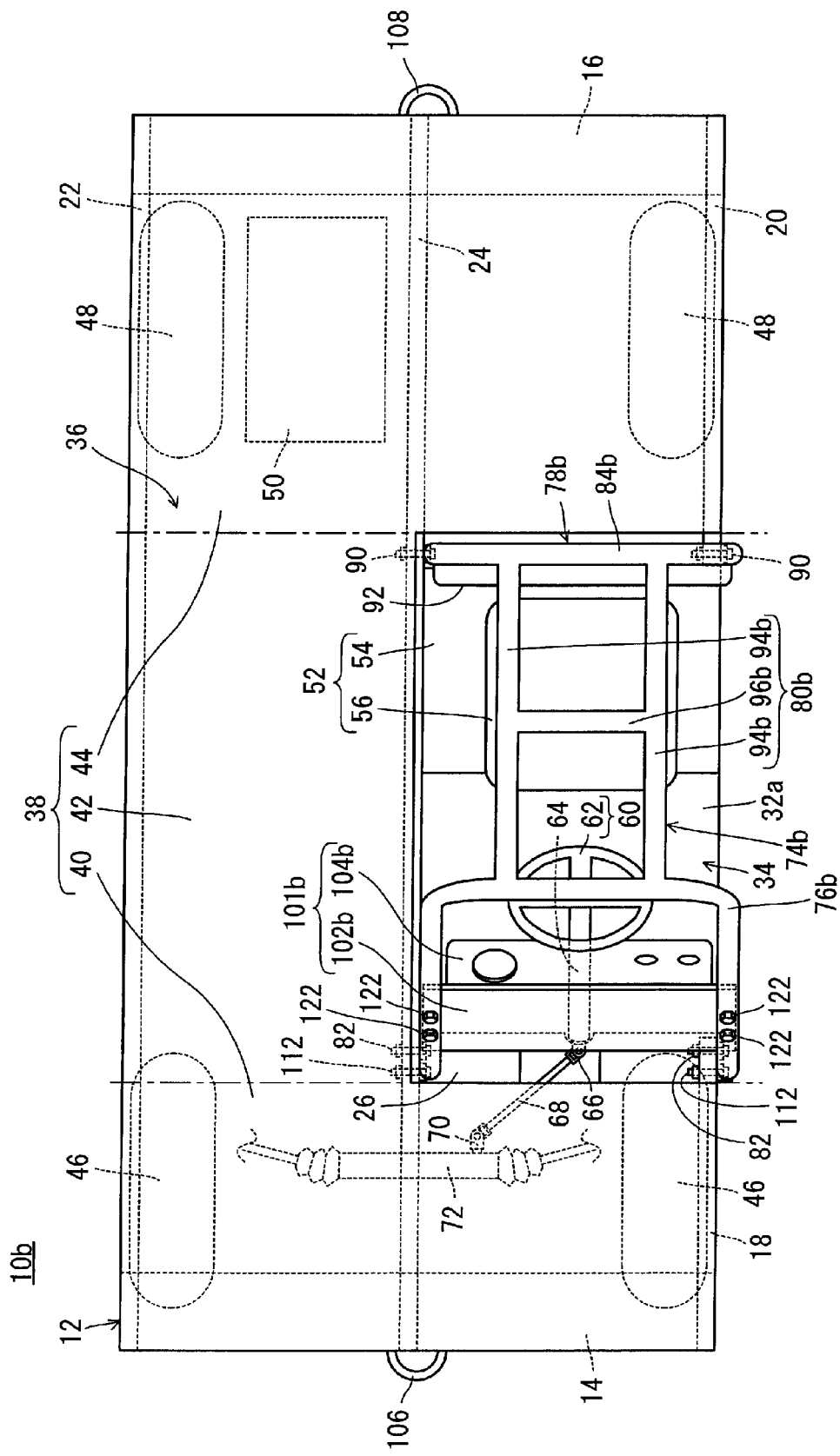
FIG. 9 is a plan view of a vehicle according to still another preferred embodiment of the present invention.
Figure 10:
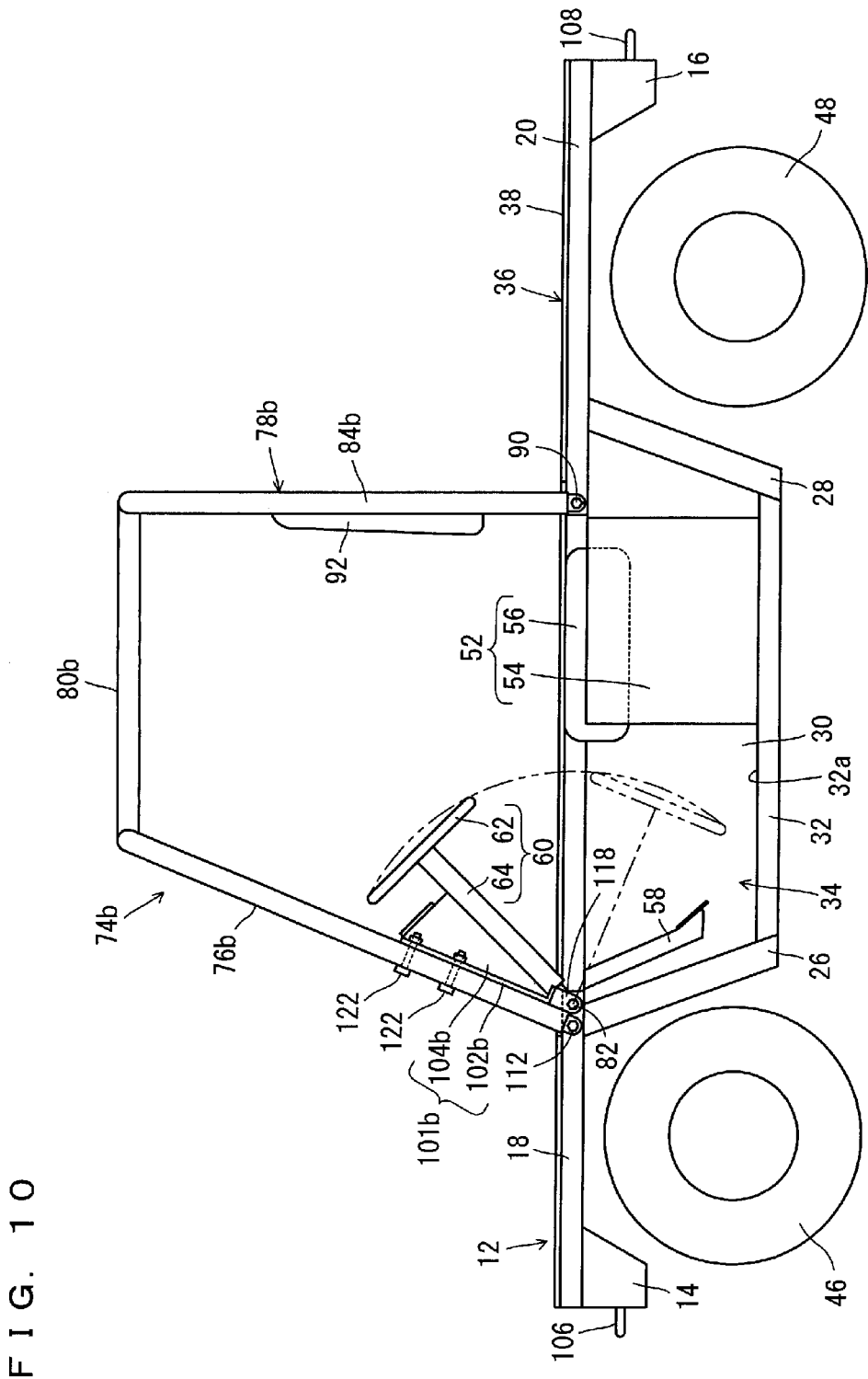
FIG. 10 is a side view of the vehicle in FIG. 9 according to the still another preferred embodiment of the present invention.
Figure 11:
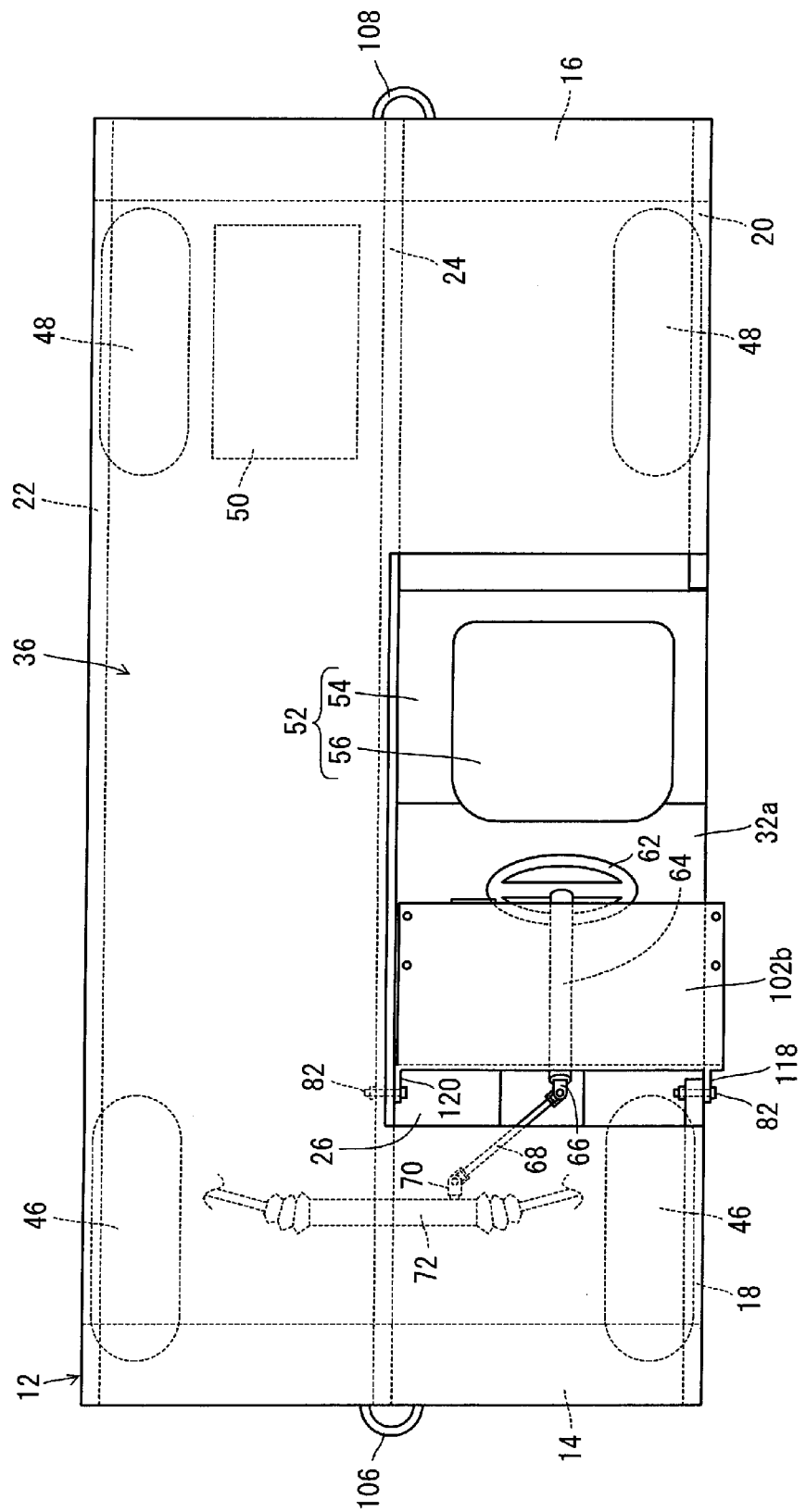
FIG. 11 is a plan view of the preferred embodiment shown in FIG. 9 and FIG. 10, in which a protective frame is removed and an operation control is in a folded state.
Figure 12:
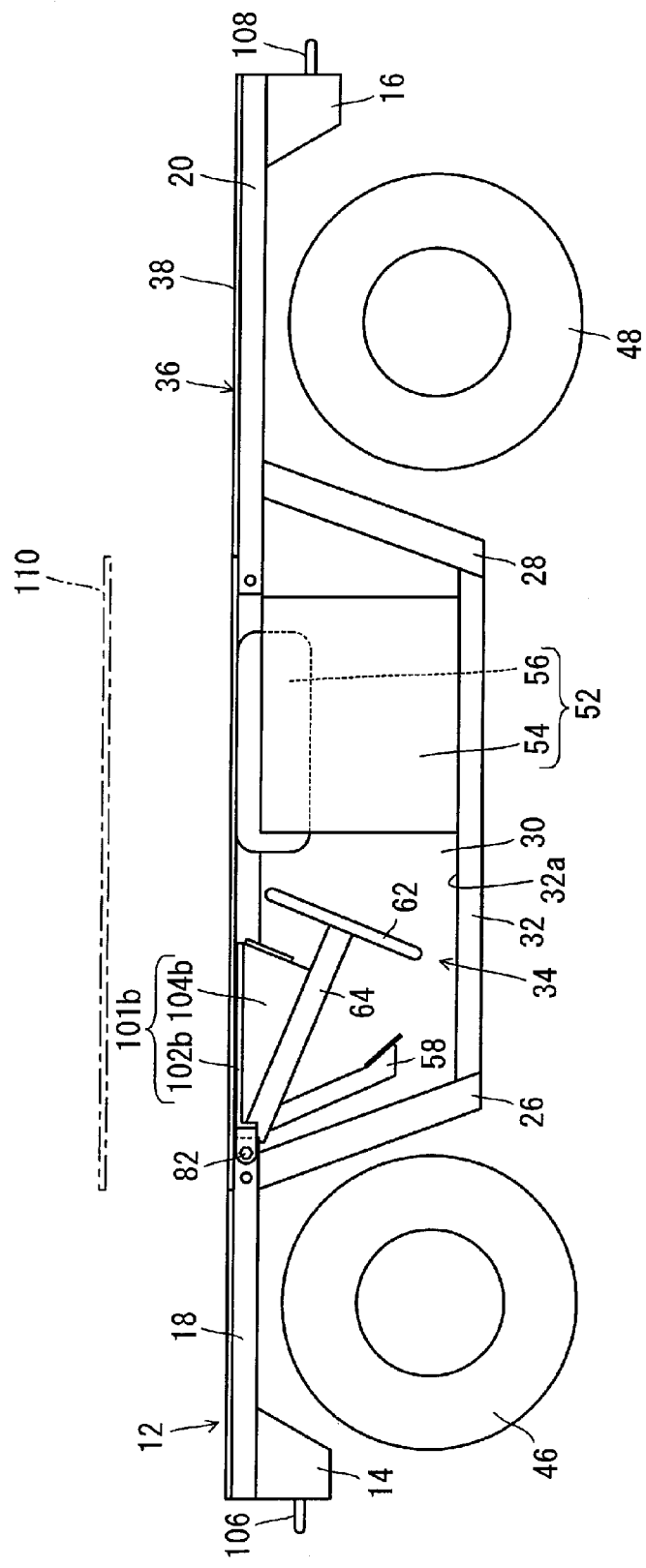
FIG. 12 is a side view of the preferred embodiment shown in FIG. 9 and FIG. 10, in which the protective frame is removed and the operation control is in the folded state.

Next, reference will be made to FIG. 9 and FIG. 10 to describe a vehicle 10b according to another preferred embodiment of the present invention.

The vehicle 10b includes a protective frame 74b instead of the protective frame 74 of the vehicle 10 shown in FIG. 1 and FIG. 2. Normally, the protective frame 74b is raised to project higher than the upper surface 38 of the body 12. The protective frame 74b includes a front frame 76b, a rear frame 78b and an upper frame 80b. The front frame 76b, the rear frame 78b and the upper frame 80b are preferably integral with each other, and the protective frame 74b is generally U-shaped in a side view.

The front frame 76b is located at a front area of the operation deck 34 and is generally U-shaped. The front frame 76b is connected to the longitudinal frames 18 and 24 near an upper end of the front wall portion 26. The front frame 76b includes a left end portion connected to a left-side surface of a rear end portion of the longitudinal frame 18 with a fastener 112. The front frame 76b includes a right end portion connected to a left-side surface of the longitudinal frame 24, at a position corresponding to the rear end portion of the longitudinal frame 18 in terms of the left-right direction, with a fastener 112. In other words, the front frame 76b includes two side-pillar portions positioned side-by-side in the left-right direction of the body 12.

The rear frame 78b is located at a rear area of the operation deck 34, and includes a generally U-shaped frame portion 84b, and a straight bar-shaped frame portion (not illustrated) which connects two near-end portions of the frame portion 84b with each other. The frame portion 84b includes two end portions positioned at a rear of the operation deck 34 but forward of the rear portion 42. The frame portion 84b includes a left end portion connected to a left-side surface of a front end portion of the longitudinal frame 20 with a fastener 90. The frame portion 84b includes a right end portion connected to a left-side surface of the longitudinal frame 24, at a position corresponding to the front end portion of the longitudinal frame 20 in terms of the left-right direction, with a fastener 90. In other words, the frame portion 84b includes two side-pillar portions positioned side-by-side in the left-right direction of the body 12. The rear frame 78b is provided with a seat back 92.

The upper frame 80b preferably is generally H-shaped, for example. The upper frame 80b includes two beam-shaped members 94b preferably disposed in parallel or substantially in parallel to each other, and a brace member 96b connecting the two beam-shaped members 94b with each other at their middle portions. The upper frame 80b connects the front frame 76b and the rear frame 78b with each other. In other words, the two beam-shaped members 94b include front end portions connected integrally with a center portion of the front frame 76b by welding, for example, and the two beam-shaped members 94b include rear end portions connected integrally to a substantially center portion of the frame portion 84b in the rear frame 78b by welding, for example.

The steering shaft 64 is connected with the front frame 76b of the protective frame 74b, described above, by a connecting portion 101b. The connecting portion 101b includes, for example, a plate portion 102b which has a general shape of a letter L in a side view, and an operation panel 104b which includes input devices, instruments, etc.

The plate portion 102b is connected pivotably to the longitudinal frames 18 and 24 near an upper end of the front wall portion 26. In other words, the plate portion 102b includes a tong 118 connected to the left-side surface of the rear end portion of the longitudinal frame 18 with a fastener 82 and the plate portion 102b includes a tong 120 connected to a left-side surface of the longitudinal frame 24, at a position corresponding to the rear end portion of the longitudinal frame 18 in terms of the left-right direction, with a fastener 82. Therefore, the plate portion 102b is pivotable on the two fasteners 82 along a vertical plane which includes the fore-aft direction into or out of the operation deck 34 in a side view. It should be noted here that the two fasteners 82 and the universal joint 66 are provided on substantially the same axis extending in the left-right direction of the body 12. In other words, the plate portion 102b and the operation control 60 are supported substantially coaxially. The fasteners 82 in the vehicle 10b are provided at the same positions as those in the vehicle 10. Also, in the vehicle 10b, the fasteners 112 are attached to their respective longitudinal frames 18, 24, at a more forward position than the fasteners 82.

The plate portion 102b and the steering shaft 64 of the operation control 60 are integral with each other via the operation panel 104b. The plate portion 102b and the operation control 60 are integral with each other via the operation panel 104b, and are pivotable integrally as a whole into or out of the operation deck 34 in a side view.

The plate portion 102b is connected to the two side-pillar portions of the front frame 76b, at two near-end portions of the front frame 76b, with a plurality (four according to the present preferred embodiment) of fasteners 122. The plate portion 102b is attached to the front frame 76b from behind.

Other configurations are preferably the same as the vehicle 10, so repetitive description will not be given here.

Referring to FIG. 9 through FIG. 12, description will now be made for a removal of the protective frame 74b and a folding operation of the operation control 60 in the vehicle 10b.

First, the two fasteners 112 and the four fasteners 122 are removed from the front frame 76b of the protective frame 74b, while the two fasteners 90 are removed from both end portions of the rear frame 78b, to remove the protective frame 74b from the body 12. Then, the connecting portion 101b is pivoted on the two fasteners 82 so that it will not project higher than the upper surface 38 of the body 12. This folding operation simultaneously moves the operation control 60, i.e., the steering wheel 62 and the steering shaft 64, to be pivoted on the universal joint 66 and be stowed in the operation deck 34 so that it will not project higher than the upper surface 38 of the body 12.

According to the vehicle 10b as described above, it is possible, as in the vehicle 10, to reduce the risk of cargo shifting into the operation deck 34. Also, it is possible to provide a large single flat bed on the upper surface 38 of the body 12 to allow even a wide object to be placed stably on the upper surface 38 of the body 12. Further, the protective frame 74b can be removed, and the control 60 can be folded and stowed in the operation deck 34. Once the protective frame 74b has been removed and the operation control 60 are folded, the protective frame 74b and the operation control 60 are no longer obstacles, and therefore the body 12 can satsifactorily function as a cargo bed not only for wide objects but also for long objects.

It is possible to pivot the operation panel 104b together with the operation control 60 so that it will not project higher than the upper surface 38 of the body 12.

Since the plate portion 102b and the operation control 60 are supported coaxially, it is easy to pivot the plate portion 102b and the operation control 60 thereby easily folding the plate portion 102b and the operation control 60.

Since the protective frame 74b includes the front frame 76b, the rear frame 78b and the upper frame 80b, the arrangement can protect the operator from tree branches and other obstacles even if the vehicle 10b is driven off-road and into bushes or woods, for example.

The seat 52 includes a seating surface substantially as high as the upper surface 38 of the body 12. Therefore, when the protective frame 74b is removed and the lid member 110 is placed in the operation deck 34 to make a substantially flush surface with the upper surface 38 of the body 12, it is possible to use the seat 52 as a support for the lid member 110.

Figure 13:
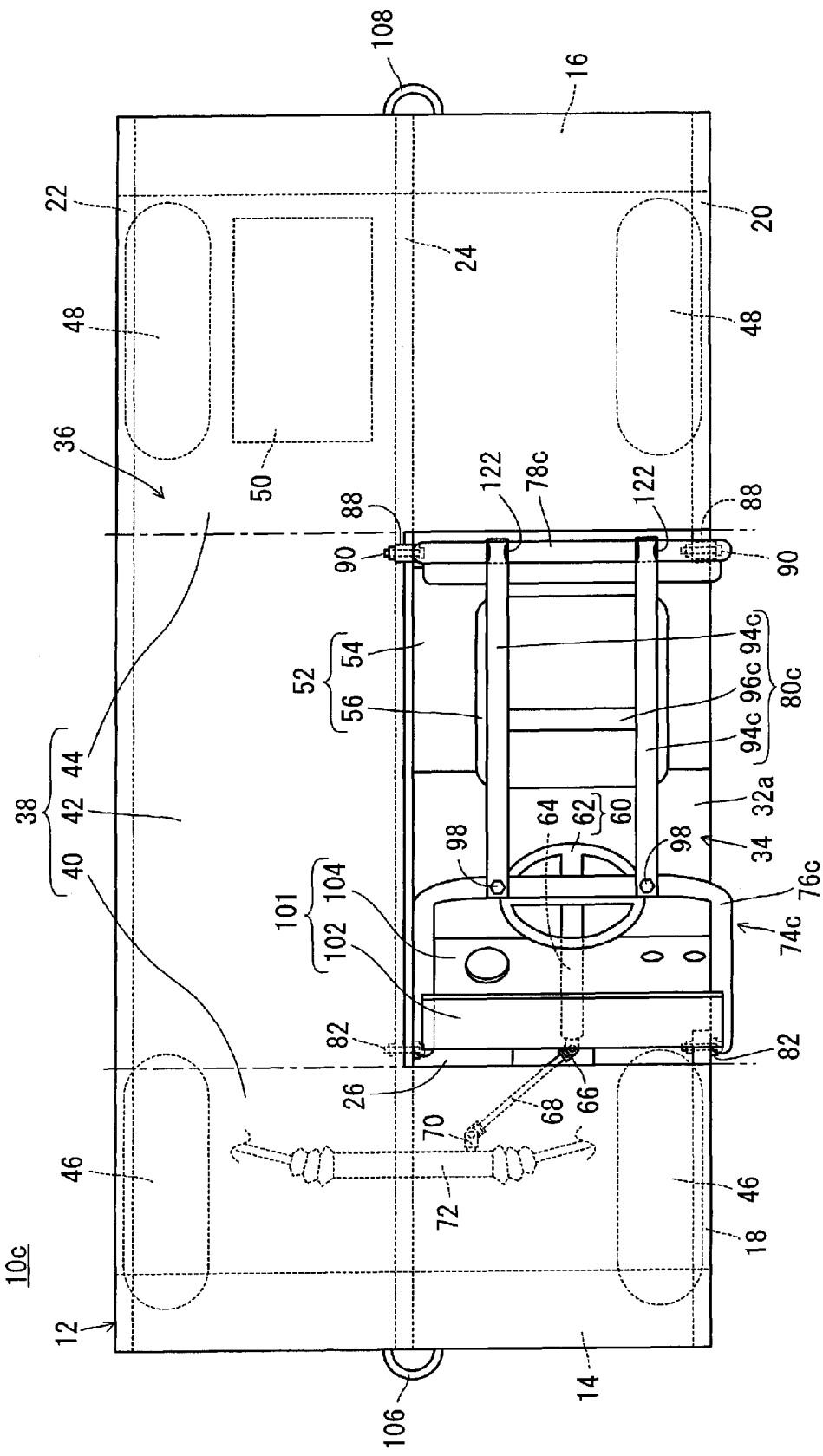
FIG. 13 is a plan view of a vehicle according to still another preferred embodiment of the present invention.
Figure 14:
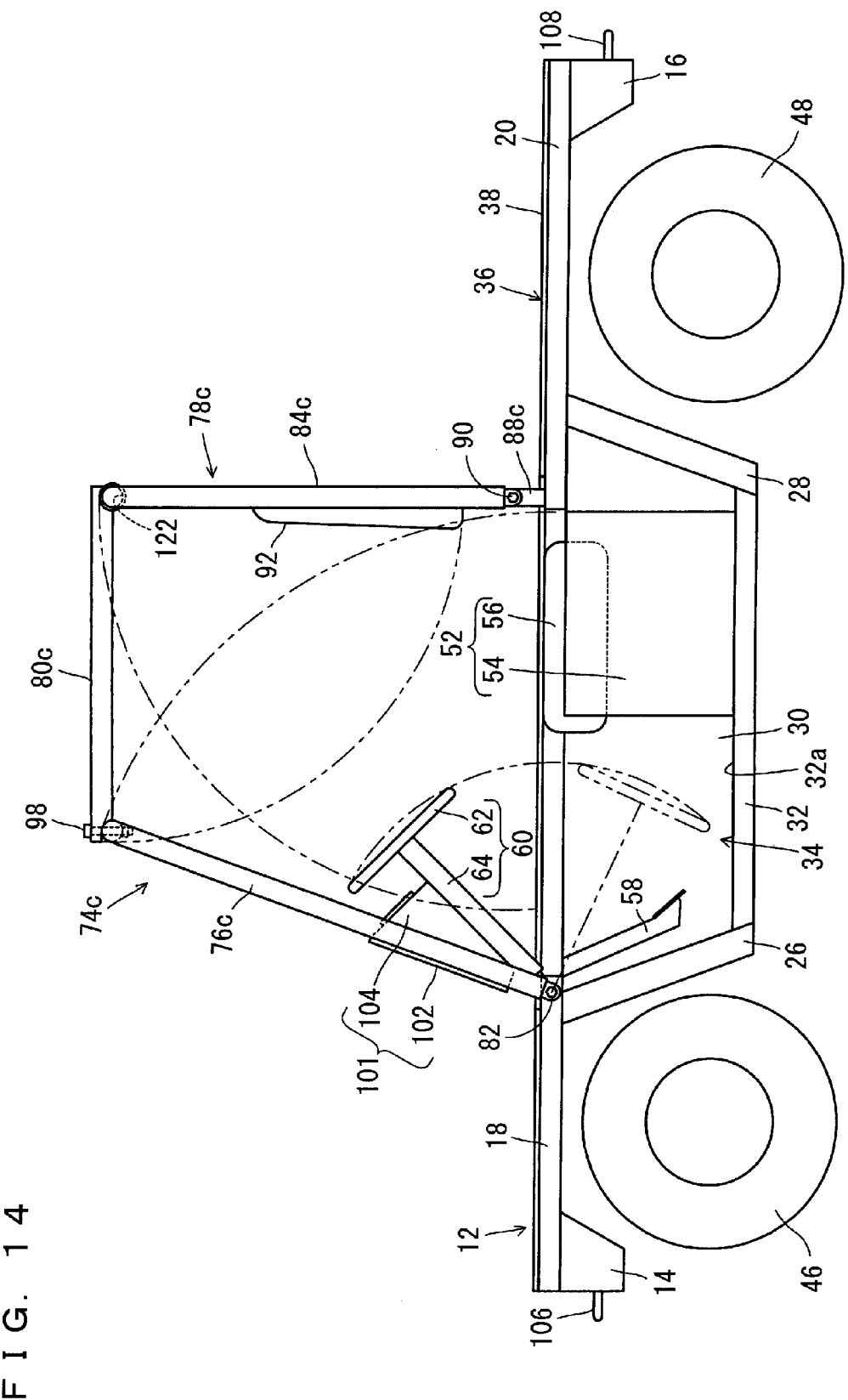
FIG. 14 is a side view of the vehicle in FIG. 13 according to still another preferred embodiment of the present invention.

Further, reference will be made to FIG. 13 and FIG. 14 to describe a vehicle 10c according to still another preferred embodiment of the present invention.

The vehicle 10c includes a protective frame 74c instead of the protective frame 74 of the vehicle 10 shown in FIG. 1 and FIG. 2. Normally, the protective frame 74c is raised to project higher than the upper surface 38 of the body 12. The protective frame 74c includes a front frame 76c, a rear frame 78c and an upper frame 80c, and is generally U-shaped in a side view.

The front frame 76c is located at a front area of the operation deck 34 and is generally U-shaped. The front frame 76c is connected pivotably to the longitudinal frames 18 and 24 near an upper end of the front wall portion 26. The front frame 76c includes a left end portion connected to a left-side surface of a rear end portion of the longitudinal frame 18 with a fastener 82. The front frame 76c includes a right end portion connected to a left-side surface of the longitudinal frame 24, at a position corresponding to the rear end portion of the longitudinal frame 18 in terms of the left-right direction, with a fastener 82. In other words, the front frame 76c includes two side-pillar portions positioned side-by-side in the left-right direction of the body 12. Therefore, the front frame 76c is pivotable on the two fasteners 82 along a vertical plane which includes the fore-aft direction into or out of the operation deck 34 in a side view. It should be noted here that the two fasteners 82 and the universal joint 66 are provided on substantially the same axis extending in the left-right direction of the body 12. In other words, the front frame 76c and the operation control 60 are supported substantially coaxially.

Figure 15:
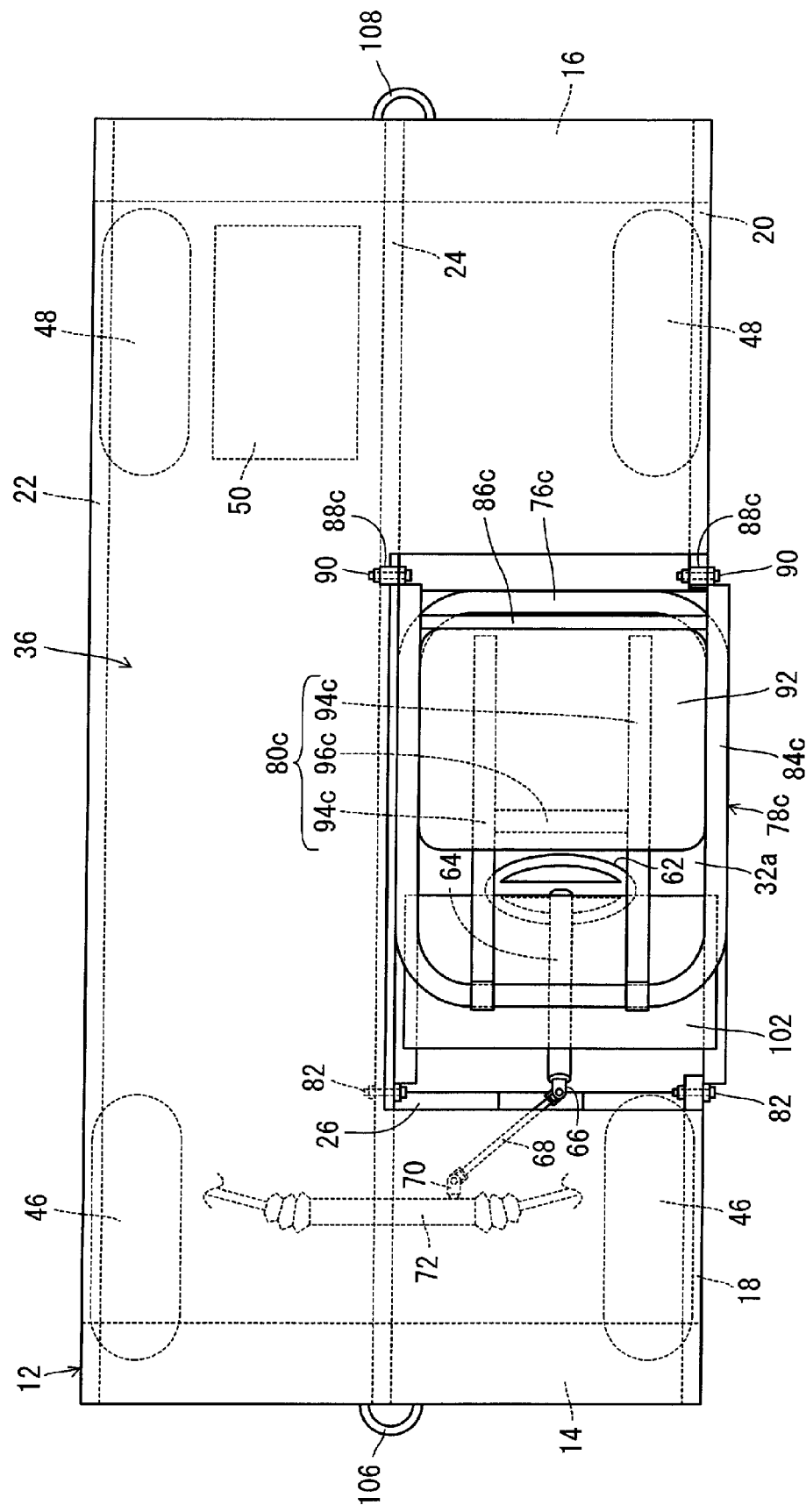
FIG. 15 is a plan view of the preferred embodiment shown in FIG. 13 and FIG. 14, in which a protective frame and an operation control are in a folded state.
Figure 16:
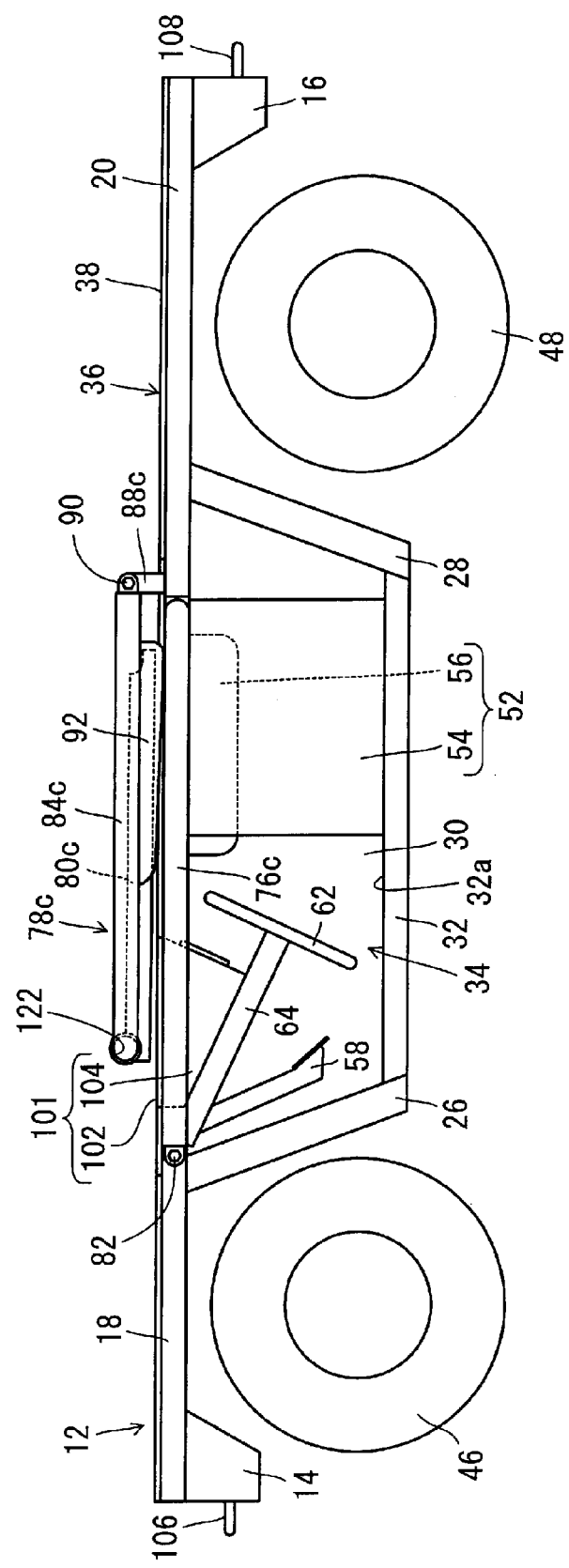
FIG. 16 is a side view of the preferred embodiment shown in FIG. 13 and FIG. 14, in which the protective frame and the operation control are in the folded state.

The rear frame 78c is located at a rear area of the operation deck 34, and includes a generally U-shaped frame portion 84c, a straight bar-shaped frame portion 86c (see FIG. 15) which connects two near-end portions of the frame portion 84c with each other, and two rod-shaped members 88c. The two rod-shaped members 88c are located at a rear of the operation deck 34 but forward of the rear portion 42. One of the rod-shaped members 88c is erected on a front end portion of the longitudinal frame 20. The other rod-shaped member 88c is erected on the longitudinal frame 24 at a position corresponding to the front end portion of the longitudinal frame 20 in terms of the left-right direction. In other words, the two rod-shaped members 88c are spaced apart from each other in the left-right direction of the body 12. The frame portion 84c includes two end-portions connected to respective ones of the two rod-shaped members 88c with two fasteners 90. This arrangement makes the frame portion 84c pivotable on the two fasteners 90 along a vertical plane which includes the fore-aft direction. The frame portion 84c is provided with a seat back 92.

The upper frame 80c preferably is generally H-shaped, for example. The upper frame 80c includes two beam-shaped members 94c preferably disposed in parallel or substantially in parallel to each other, and a brace member 96c connecting the two beam-shaped members 94c with each other at their middle portions. The upper frame 80c connects the front frame 76c and the rear frame 78c with each other. In the present preferred embodiment, the two beam-shaped members 94c include front end portions connected with a center portion of the front frame 76c by two fasteners 98. Also, the two beam-shaped members 94c include rear end portions each provided with a through-hole 122. The frame 84c is inserted through the through-holes 122 with the rear end portions of the two beam-shaped members 94c connected to a substantially center portion of the frame portion 84c of the rear frame portion 78c. As described, the upper frame 80c is connected with the frame portion 84c so that the upper frame 80c is pivotable at a substantially central portion of the frame portion 84c.

Other configurations are preferably the same as the vehicle 10, so repetitive description will not be given here.

Referring to FIG. 13 through FIG. 16, description will now be made for a folding operation of the operation control 60 and the protective frame 74c in the vehicle 10c.

First, the two fasteners 98 are removed to separate the upper frame 80c from the front frame 76c. Thereafter, the front frame 76c is pivoted on the two fasteners 82 until it comes in contact with an upper surface of the seat base 54 of the seat 52. This folding operation simultaneously moves the operation control 60, i.e., the steering wheel 62 and the steering shaft 64, to be pivoted on the universal joint 66 and stowed in the operation deck 34 so that it will not be higher than the upper surface 38 of the body 12. Then, the upper frame 80c is pivoted toward the frame portion 84c on the center portion of the frame portion 84c thereby folding the upper frame 80c. In this state, the upper frame 80c and the frame portion 84c are pivoted forward on the two fasteners 90 until the seat back 92 comes in contact with the upper surface of the seat plate 56. Performing the above-described procedure, the operation control 60 and the protective frame 74c can be folded down. According to the vehicle 10c, with the operation control 60 and the protective frame 74c being folded, the front frame 76c no longer projects above the upper surface 38 of the body 12, but the rear frame 78c and the upper frame 80c project above the upper surface 38 of the body 12.

The vehicle 10c as described above provides the same advantages as offered by the vehicle 10.

Also, according to the vehicle 10c, the protective frame 74c becomes ready for the folding operation only by removing the fasteners 98 thereby separating the upper frame 80c from the front frame 76c, and there is no need to separate the upper frame 80c from the rear frame 78c. Therefore, the folding operation of the protective frame 74c can be simple and quick.

In the preferred embodiments described above, the connecting portion preferably includes a plate portion and an operation panel, for example. However, the present invention is not limited to this. The connecting portion need not necessarily include a plate portion.

Also, the front portion 40, the side portion 42 and the rear portion 44 are preferably flat in the upper surface 38 of the body 12. However, the present invention is not limited to this. The upper surface of the body preferably is flat along the side portion and at least one of the front and rear portions.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
a body including an operation deck and an upper surface which is higher than a bottom surface of the operation deck;
an operation control provided at a front area of the operation deck and arranged to project higher than the upper surface of the body; and
a protective frame provided on the body and arranged to project higher than the upper surface of the body and above the operation deck; wherein
the upper surface of the body includes a front portion which represents a front area, a side portion which represents a side area, and a rear portion which represents a rear area, as viewed from the operation deck;
the upper surface of the body is substantially flat along the side portion and at least one of the front and rear portions;
the operation control is arranged to be folded to stow the operation control in the operation deck;
the protective frame is arranged to be removed from the body, or at least a portion of the protective frame is arranged to be folded to stow the protective frame in the operation deck;
the protective frame includes a front frame located at the front area of the operation deck; and
when at least the portion of the protective frame is folded, the front frame does not project higher than the upper surface of the body.

2. The vehicle according to claim 1, wherein
the vehicle further comprises a connecting portion connecting the front frame and the operation control with each other; and
the front frame is arranged to pivot with the operation control into and out of the operation deck, as seen in a side view of the vehicle.

3. The vehicle according to claim 2, wherein the protective frame further includes a rear frame arranged to pivot at a rear area of the operation deck, and an upper frame provided above the operation deck and connecting the front frame and the rear frame with each other.

4. The vehicle according to claim 1, wherein the front frame is arranged to pivot into and out of the operation deck in a side view of the vehicle, and the protective frame includes a rear frame provided at a rear area of the operation deck and arranged to pivot into and out of the operation deck in the side view of the vehicle.

5. The vehicle according to claim 4, further comprising a lid member arranged to be placed on the front frame and the rear frame after the front frame and the rear frame are folded.

6. The vehicle according to claim 1, further comprising a seat provided in the operation deck, wherein the seat includes a seating surface arranged at a height substantially corresponding to a height of the upper surface of the body.

7. The vehicle according to claim 1, further comprising a coupler provided in the body to connect the vehicle with another vehicle.

8. A vehicle comprising:
a body including an operation deck and an upper surface which is higher than a bottom surface of the operation deck;
an operation control provided at a front area of the operation deck and arranged to project higher than the upper surface of the body; and
a protective frame provided on the body and arranged to project higher than the upper surface of the body and above the operation deck; wherein the upper surface of the body includes a front portion which represents a front area, a side portion which represents a side area, and a rear portion which represents a rear area, as viewed from the operation deck;

the upper surface of the body is substantially flat along the side portion and at least one of the front and rear portions;

the operation control is arranged to be folded to stow the operation control in the operation deck;

the protective frame is arranged to be removed from the body, or at least a portion of the protective frame is arranged to be folded to stow the protective frame in the operation deck;

the protective frame includes a front frame located at the front area of the operation deck;

the vehicle further includes a connecting portion connecting the front frame and the operation control with each other;

the front frame is arranged to pivot with the operation control into and out of the operation deck, as seen in a side view of the vehicle; and the connecting portion includes an operation panel, and the operation control and the front frame are connected with each other via the operation panel.

9. A vehicle comprising:

a body including an operation deck and an upper surface which is higher than a bottom surface of the operation deck;

an operation control provided at a front area of the operation deck and arranged to project higher than the upper surface of the body; and a protective frame provided on the body and arranged to project higher than the upper surface of the body and above the operation deck; wherein the upper surface of the body includes a front portion which represents a front area, a side portion which represents a side area, and a rear portion which represents a rear area, as viewed from the operation deck;

the upper surface of the body is substantially flat along the side portion and at least one of the front and rear portions;

the operation control is arranged to be folded to stow the operation control in the operation deck;

the protective frame is arranged to be removed from the body, or at least a portion of the protective frame is arranged to be folded to stow the protective frame in the operation deck;

the protective frame includes a front frame located at the front area of the operation deck;

the vehicle further includes a connecting portion connecting the front frame and the operation control with each other;

the front frame is arranged to pivot with the operation control into and out of the operation deck, as seen in a side view of the vehicle; and the front frame and the operation control are supported substantially coaxially.

\* \* \* \* \*